United States Patent [19]

Barton

[11] Patent Number: 5,351,718
[45] Date of Patent: Oct. 4, 1994

[54] ACCESS PLUG FLANGE

[76] Inventor: David D. Barton, 5451 Maple, Houston, Tex. 77096

[21] Appl. No.: 82,998

[22] Filed: Jun. 28, 1993

[51] Int. Cl.⁵ ............................................. F16L 55/10
[52] U.S. Cl. ........................................ 138/92; 138/94
[58] Field of Search ................... 138/90, 92, 94, 89; 220/307, 3.8; 215/355; 217/98

[56]  References Cited

U.S. PATENT DOCUMENTS

| | | | |
|---|---|---|---|
| 781,408 | 1/1905 | DuBois | 215/355 |
| 2,559,210 | 7/1951 | Bradley | 138/90 |
| 3,756,287 | 9/1973 | Bishop | 138/92 |
| 3,773,086 | 11/1973 | Kurz | 138/92 |
| 3,827,462 | 8/1974 | Celesta | 138/92 |
| 3,940,308 | 2/1976 | Blanchfield | 138/92 |
| 4,091,842 | 5/1978 | Greenawalt et al. | 138/90 |
| 4,290,536 | 9/1981 | Morel | 220/307 |
| 5,010,926 | 4/1991 | Kurth et al. | 138/92 |
| 5,014,866 | 5/1991 | Moore | 138/92 |

FOREIGN PATENT DOCUMENTS 0095108  1/1963  Denmark ............................. 138/92

*Primary Examiner*—Timothy F. Simone
*Assistant Examiner*—James F. Hook
*Attorney, Agent, or Firm*—Pravel, Hewitt, Kimball & Krieger

[57]  ABSTRACT

An access plug flange and sealing plug are provided for inspection ports on chemical processing vessels. The plug flanges are easily installed, while remaining firmly and securely in place; the sealing plug is also easily removable from the flange for inspection purposes.

23 Claims, 3 Drawing Sheets

ACCESS PLUG FLANGE

BACKGROUND OF THE INVENTION

1. Field of Invention

The present invention relates to access plug flanges for inspection ports in processing equipment insulation.

2. Description of Prior Art

In chemical processing, container and pipe walls are typically covered with foam coatings or other insulation materials inside jackets or covers for thermal insulation. For various reasons including safety and environmental concern, periodic inspections of the vessel and pipe walls must be performed. Access through the insulation to the vessel or pipe wall has been provided through pre-cut or drilled inspection holes or ports formed in the jacket and insulation coating. It has been the practice for protection against moisture and weather conditions to have the inspection ports normally sealed with plugs. For this reason, it has been customary to mount access flanges in the inspection holes to receive sealing plugs.

An example of this type equipment is that of U.S. Pat. No. 4,091,842. The access flanges were closed by the sealing plugs during normal service conditions. The plugs were intended to be removable when wall inspections or tests were required. However, there were problems.

If the plugs were easily removable, they often did not effectively seal the inspection port against weather and moisture. If the plug were lost, water contact with certain types of insulation materials produced a chlorine effect which with some grades of stainless steel vessels resulted in premature failure due to embrittlement. If the plugs sealed too tightly, they often could not be removed without damaging the flange connection with the insulation and jacket. It was not unusual for the plug to be so tightly fitted in the flange that when the plug was pulled, the entire flange assembly pulled free along with portions of the insulative cover. Other problems with prior art access plugs and flanges have included the requirement for expensive, special purpose installation tools and procedures and the possibility of plug loss or separation of the plug from the flange. A vessel surface exposed to moisture due to a lost or misplaced plug was unacceptable because of leakage or hazardous emissions.

SUMMARY OF INVENTION

Briefly, the present invention provides a new and improved access plug flange assembly for thermal insulation in processing equipment. The access plug flange assembly according to the present invention includes a flange assembly which is adapted for fitting into an insulation covering on the processing equipment. The processing equipment is a vessel which according to the present invention may be container pipe, conduit or the like.

The flange assembly according to the present invention includes a flange which is fitted into the insulation to serve as a receiving member. The flange has a sleeve member which conforms to a side wall of the pre cut hole to fit into the insulation covering. The flange also has a collar member formed at upper end of the sleeve member. The collar member has an access passage formed therein for insertion of the inspection probes or test equipment.

The flange assembly according to the present invention also includes a sealing plug which is insert able into the access passage of the collar member to make sealing contact and is also retained by a safety line to prevent plug loss. The sealing plug has a side wall member which is parallel to the sleeve member side wall for sealing against it. The sealing plug also has a central barrier wall extending between the connecting and side wall member at its lower end to seal the access passage in the collar member.

A central recess is formed in the sealing plug within the side wall member and above the central barrier wall. A raised gripping tab is formed in the sealing plug above the central barrier wall in the central recess. The gripping tab provides a gripping contact area by which the sealing plug may be deformed from the flange internal diameter to loosen it from the wall surfaces.

With the present invention, it has been found that the sealing plug has tended to stick to the inner wall of the sleeve member and resist removal forces after extended time period. The gripping tab on the sealing plug according to the present invention when pulled outwardly releases or collapses the central barrier wall of the sealing plug inwardly in a corresponding movement. The outward movement of the central barrier wall tends to collapse the sealing plug side wall members inwardly away from the sleeve member side walls of the flange, overcoming the tendency of the plug to adhere to the flange against removal forces.

DESCRIPTION OF THE PREFERRED EMBODIMENT

Figure 1:
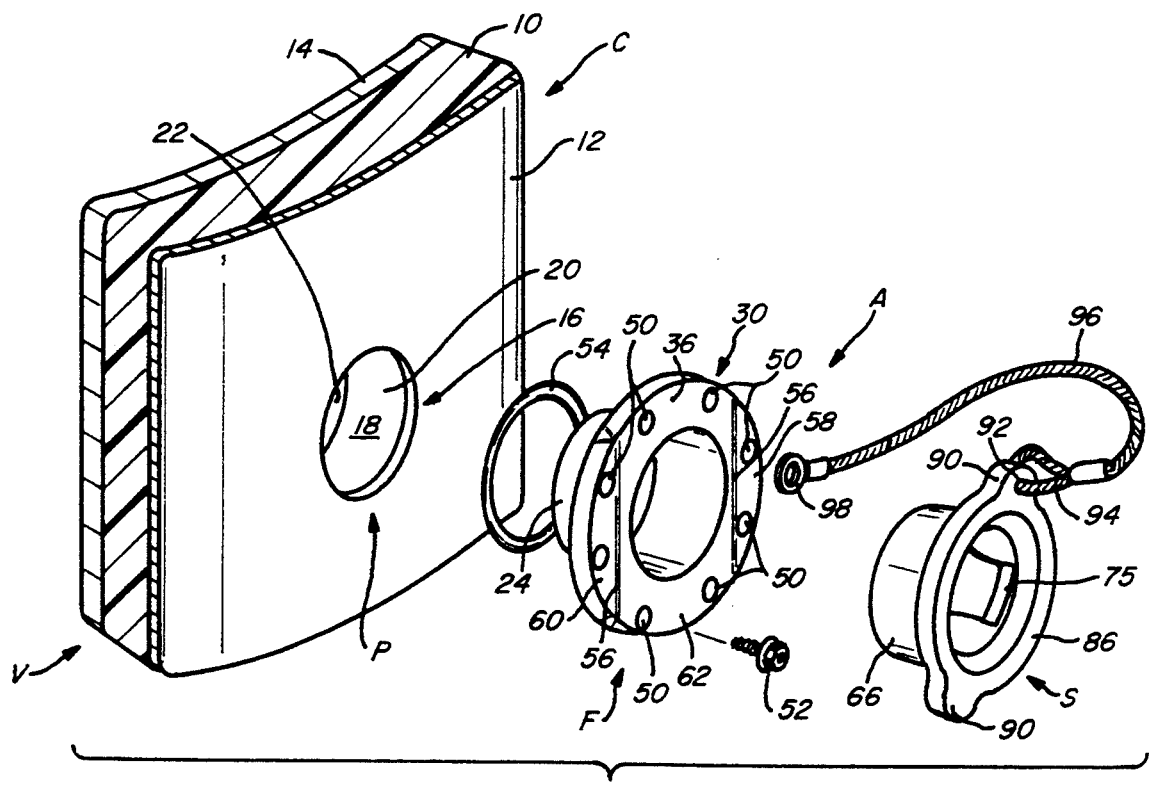
FIG. 1 is an exploded isometric view of a flange assembly for sealing an access plug according to the present invention.

In the drawings, the letter A designates generally a flange assembly for sealing a port P in insulative covering C, usually an insulative material 10 inside an outer metal covering or jacket 12, on a wall 14 of a chemical processing vessel V. As used in the present invention, the term vessel is intended to refer to vessels, containers or other equipment in chemical processing systems, as well as pipes, tubing or conduits connecting such equipment.

The port P is generally a cylindrical opening or pre-cut hole 16 formed extending inwardly from a circular hole 18 cut in the jacket 12. The hole 18 extends through a cylindrical side wall 20 in the insulative covering 10 to a metal external surface 22 of the vessel wall 14. When the port P is open, access for inspection or test probes or other test equipment to the surface 22 is provided.

The access flange assembly A of the present invention includes a flange F which is fitted into the port P to serve as a receiving member for a sealing plug S.

The flange F is typically integrally formed as a single structural unit from a metal of suitable strength with weather and corrosion resistance characteristics. The flange F includes a generally cylindrical sleeve member 24 having a side wall 26 with a planar or flat vertical cross-section along its inner extent. The side wall 26 along its planar extent conforms to and is in sealing contact with the cylindrical side surface wall 20 of the insulative covering 10. The sleeve member 24 may also have an inwardly curved lower fitting lip 28 formed at its lower end. The fitting lip 28 may be of any suitable radius or angular extent, such as 45° or 60° to allow for easier fitting of the sleeve member 24 into the opening 16 of the port P.

The flange F also includes a collar member 30 integrally formed with the sleeve member 24 and extending generally radially outwardly therefrom. The collar member 30 has a central access opening 32 formed in it which is of equal diameter to an inner diameter 34 of the sleeve member 24. The collar member 30 includes a generally circular or other configuration disk portion 36 extending radially outwardly from the opening 32 to a downwardly extending outer closure lip 38 at an outer peripheral portion 40. The closure lip 38 extends downwardly an adequate distance to contact at a lower end 42 an outer surface 44 of the jacket 12 of the covering C.

Figure 5:
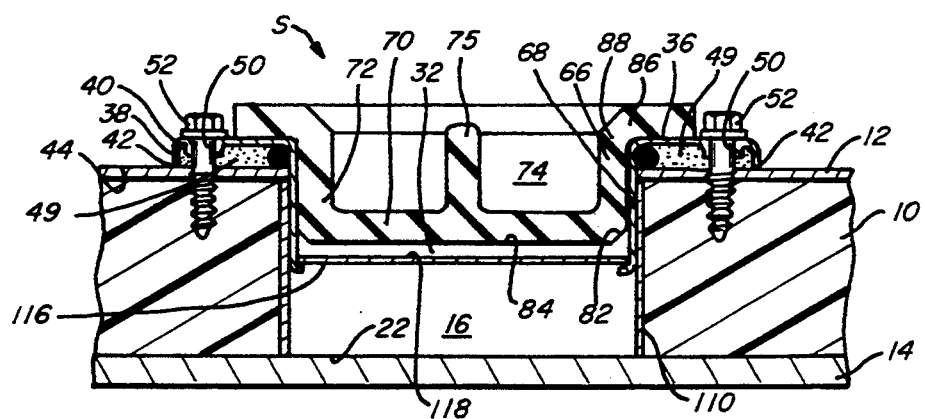

The closure lip 38 and the disk 36 of the collar member 30 together with an upper portion 46 of the sleeve member 24 define a sealant pocket 48. The sealant pocket 48 is adapted to receive and be substantially entirely filled with a sealant 49 (FIG. 5). The sealant 49 is a suitable commercially available adhesive sealing material, preferably an elastomer such as silicone. The volume of the sealant pocket 48 is such that it holds sufficient sealant 49 to exert a retentive force equal to or greater than removal forces exerted on the assembly A.

A number of radially spaced guide sleeves 50 (FIGS. 1 & 2) are formed extending inwardly into the disk portion 36 of the collar member 30. The guide sleeves 50 serve as walls of injection ports for entry of the sealing elastomer 49 into the sealant pocket 48. The guide sleeves 50 are also of a size such that a suitable number of them can receive attachment screws 52 or other suitable connecting members. The attachment screws 52 are threadedly inserted into the sealing elastomer 49 and through the jacket 12 and the covering 10. Attachment screws 52 exert a gripping, retentive force to keep the flange F sealingly mounted on the covering C. The number of attachment screws 52 usually is chosen to be a requisite number, preferably the minimum needed, to exert a retentive force, together with that exerted by the sealant in pocket 48, equal to or slightly more than the pulling force required to remove the sealing plug S from the flange F.

An O-ring or other suitable sealing member 54 is mounted about the sleeve member 24 in the sealant pocket 48 before the sealant material is inserted therein. The O-ring 54 is generally a slightly larger diameter than the height of the sealant pocket 48 between the surface 44 of the cover jacket 12 and the disk 36 of the collar member 30. In this way, the O-ring 54 is held under compression between the collar member 30 and the insulative covering C when the flange F is attached.

Figure 2:
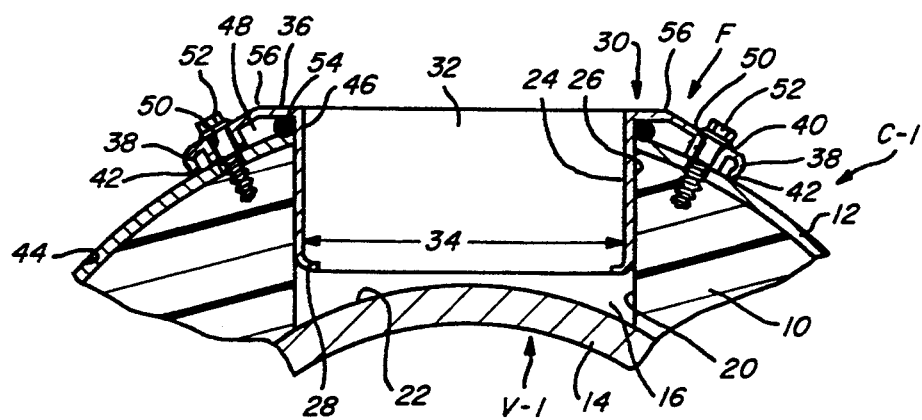
FIGS. 2, 4, and 5 are elevation views, taken partly in cross-section, of flange assemblies according to the present invention.

In certain situations, the insulative covering and the vessel may have a markedly curved exterior surface, such as a reduced diameter covering C-1 and vessel V-1 (FIG. 2). The disk member 36 of the collar member 30 of the flange F has flexure seams 56 formed by stamping or other suitable techniques in it. This permits the outer chord portions 58 and 60 to be bent or flexed with respect to a central circular segment 62 of the disk member 36. In this manner, the collar member 30 can be bent or flexed to conform to the curvature of the covering C-1 as the flange F is being attached thereto.

Considering now the sealing plug P of the flange assembly F more in detail, such member is formed of a high-temperature silicone rubber with suitable durometer and ultra-violet resistance characteristics. The sealing plug S is insertable into the access opening 32 in the collar member 30 for sealing contact therein.

The sealing plug S has a generally cylindrical side wall member 66 having an outer surface 68 (FIGS. 4 & 5) conforming to the sleeve member 24 for sealing against it. A central barrier wall 70 of the sealing plug S extends between and connects the side wall member 66 at its lower end portion 72 to form a seal or barrier across the access passage or opening 32 in the collar member 30. The sealing plug S is thus a generally cup-shaped member, having a central recess or pocket 74 formed above the barrier wall 70 and within the side wall member 66.

The sealing plug S also includes a raised lug or gripping tab 75 formed extending above the barrier wall 70. The gripping tab 75 is adapted to be gripped and pulled outwardly to break the seal the sealing plug S from the flange F to help open the port P.

With the present invention, it has been found that the prior art sealing plugs have tended to stick to the inner wall sleeve members in which they are mounted and thus resist removal forces. When attempts have later been made to pull or otherwise remove prior sealing plugs from a sleeve member, the plugs have often resisted pulling forces. Often such resistance has been to such a point that the entire sealing plug assembly would pull free along with portions of the insulative cover.

Figure 4:
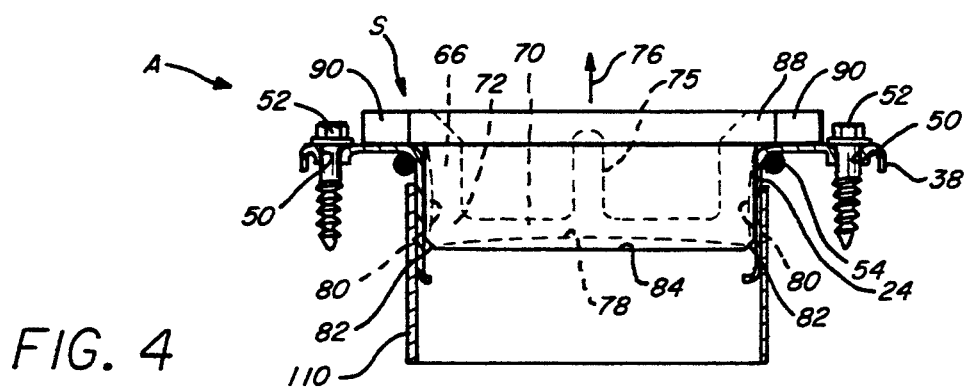

With the present invention, the gripping tab 75 when pulled outwardly has been found to exert an outward pulling force on the central barrier wall 70 of the sealing plug S in a corresponding manner. Outward movement of the central barrier wall 70 along its center portion as indicated by an arrow 76 tends to cause the central barrier wall 70 to arch outwardly as indicated in phantom at 78 (FIG. 4). This outward arching movement of the central barrier wall 70 tends to collapse the outer surface 68 as indicated in phantom at 80 (FIG. 4). Such movement causes the side wall member 66 to move away from the sleeve member 24 of the flange F. This overcomes the tendency of the sealing plug S to adhere to the flange F against removal forces. Thus, the sealing force between the sealing plug S and sleeve member 30 is broken, reducing adhesion between them. This permits easy removal of the sealing plug S from the flange F.

An insertion chamfer surface 82 is also preferably formed about the sealing plug S at an outer lower edge 84 of the barrier wall 70. The insertion chamfer surface 82 is of a reduced diameter from the remainder of the side wall 66 so that the sealing plug S may be more easily be inserted into the flange F.

It is also preferable that the outer diameter of the barrier wall 70 of the sealing plug S be slightly larger, for example, about three or four percent, than the inner diameter 34 of the access passage 32. This causes the sealing plug S to be under slight compression in the collar member 30, increasing the sealing forces. The pressure of insertion chamfer 82 permits ease of insertion when the barrier wall 70 has a slightly larger outer diameter.

A sealing lip 86 is formed on the plug S extending outwardly from an upper portion 88 of the side wall member 66. The sealing lip 86 is adapted to lie parallel to and rest on and seal against the disk member 36 of the flange F.

One or more attachment lugs 90 are formed extending radially outward from the sealing lip 86. At least one of the attachment lugs 90 has an opening 92 formed in it. The opening 92 is adapted to receive a closed end loop 94 of a connector line or cable 96. If desired, reinforcing rings or washers may be formed in the sealing plug S about the attachment lug opening 92 to protect against tearing of the lugs 90 and consequent plug loss.

The connecting line or cable 96 is preferably formed of a braided metal cable of suitable strength and moisture and corrosion resistant properties, such as braided stainless steel. The connector line 96 has an eyelet 98 formed at an opposite end from its loop 94. The eyelet 98 is adapted to receive an attachment screw 52 so that the connector cable 96 may be attached to the collar member 30 of the flange F. In this manner, the connector cable 96 fixedly attaches the plug S to the flange F. This protects against loss or misplacement of the plug S when it is moved from the port P for inspection purposes. The attachment lugs 90 also may be used for assistance in removal of the plug S from the flange F, if desired. In some situations, the attachment lugs 90 may receive screws 52 and allow the plug P to be directly attached to the collar member 30.

Figure 3:
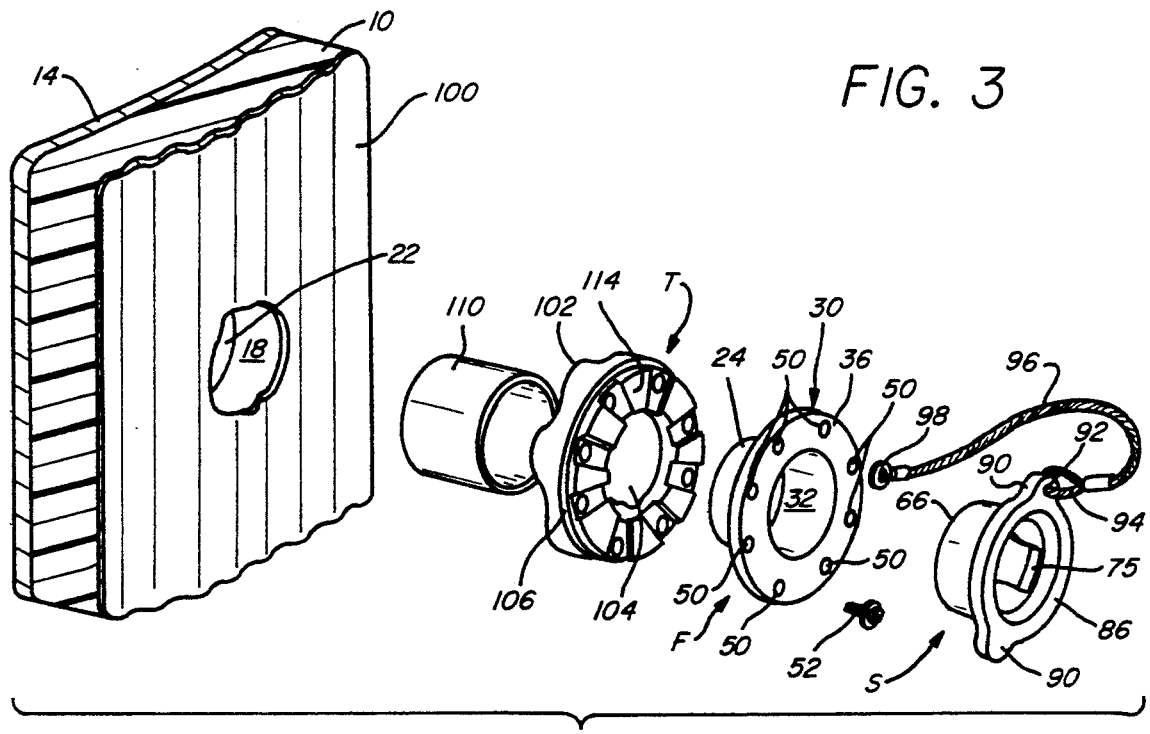
FIG. 3 is an exploded isometric view of another flange assembly according to the present invention.

Certain vessels have an uneven or corrugated undulating external cover surface, such as that shown at a cover surface 100 (FIG. 3). A transition gasket T according to the present invention is provided to fit between the external surface 100 and the flange F. The transition gasket T is formed from a suitable rubber or elastomer, having a first surface 102 conforming to the exterior surface 100 of the vessel. The surfaces 100 and 102 are then glued or otherwise mounted to each other by a suitable adhesive elastomer. If desired, small grooves or passages may be formed in the surface 102 of the transition gasket T to receive extra sealant and surface area for additional bonding strength.

The transition gasket T has a central passage or opening 104 formed extending from the surface 102 through the body of the transition gasket T to an outer or second surface 106. The central passage or opening 104 is of a diameter to receive and seal against an outer surface 108 of a connector collar 110. The connector collar 110 is a tubular member of a like material to the sleeve member 24 and is adapted to receive the sleeve member 24. Connector collar 110 fits against the side wall 20 of the insulating cover between the jacket 12 and the vessel wall 14. The connector collar 110 may also be used with the apparatus A (FIGS. 4 & 5) when no transition gasket is used.

The outer surface 106 of the transition gasket T has a surface 112 on which the sealing elastomer 49 is to be received so that the collar member 24 may be attached. The outer surface 106 also may have a number of raised surfaces or ridges 114 formed on the surface 112. This increases the surface contact area of the surface 112 for additional contact with the sealing elastomer or adhesive 49.

If desired, a plate or disk 116 can be mounted in the sleeve member 24. The disk 116 does not fully block the opening 32. For example, it has suitable openings for passage of inspection or test probes. The disk 116 is provided primarily for identification purposes. It is adapted to receive on an outer surface 118 information and data, whether in the form of bar codes or other readable form, to identify the location of the port P being sealed by the flange assembly A according to the present invention. Identification data in the form of a bar code may also be placed on the inner surface of the sleeve member 30. Although the embodiments above have a cylindrical sleeve 24 for a corresponding hole in the covering, it should be understood that the collar may be rectangular, hexagonal or other cross-section depending on the shape of the hole in the covering. In addition, the collar 30 may, if desired, be performed to a desired curvature to fit against curved coverings rather than having flexure seams for bending.

Figure 6:
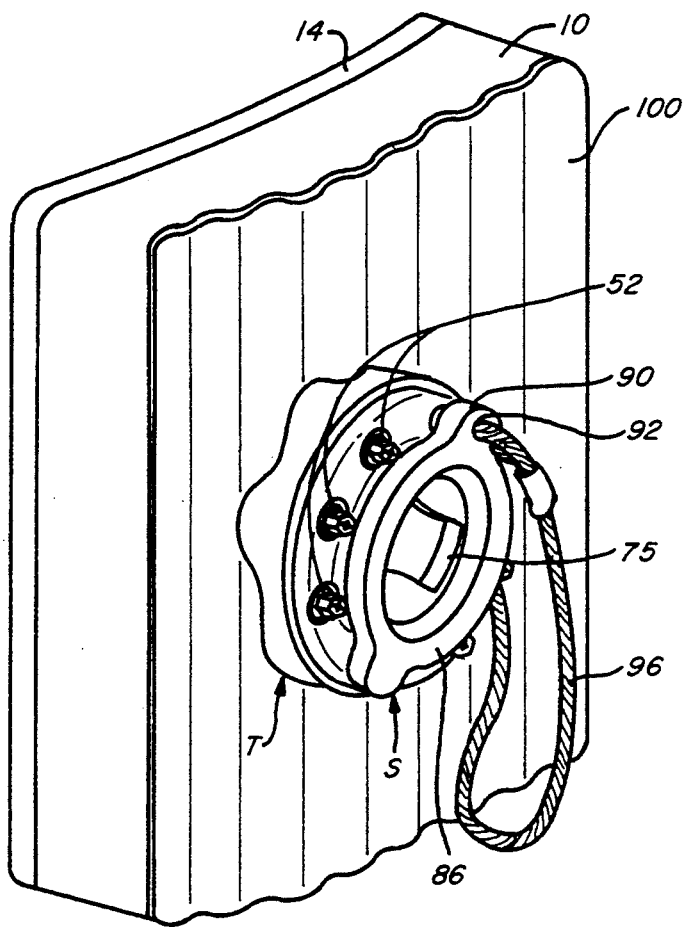
FIGS. 6 and 7 are isometric view of other flange assemblies according to the present invention.
Figure 7:
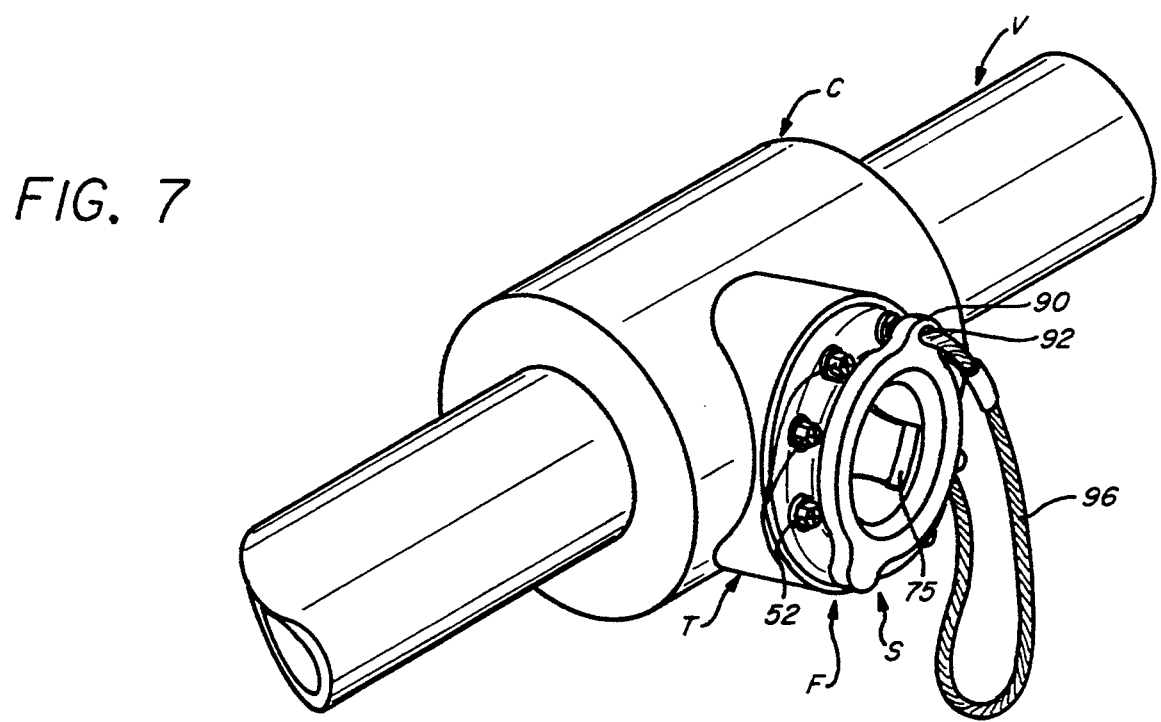

Further, the transition gasket T may be used in situations other than uneven insulation surfaces (FIG. 6). For example, the transition gasket T may be used to fit the flange F to a smaller diameter covering (FIG. 7) than convenient for bent or pre-curved collars 30.

Having described the invention above, various modifications of the techniques, procedures, material and equipment will be apparent to those in the art. It is intended that all such variations within the scope and spirit of the appended claims be embraced thereby.

I claim:

1. An access plug flange assembly for sealing an inspection port in insulation covering for a chemical processing vessel, comprising:

a flange for fitting in the insulation covering to serve as a receiving member, comprising:

a sleeve member conforming to a side wall of the insulation covering for fitting into the insulation covering;

a collar member formed at an upper end of said sleeve member;

said collar member having an access passage formed therein;

said collar member having a downwardly extending outer closure lip for contacting the insulation covering;

a sealing plug insertable into said access passage in said collar member for sealing contact therein, comprising:

a side wall member conforming to said sleeve member for sealing against it;

a central barrier wall extending between and connecting said side wall member at a lower end thereof to seal said access passage in said collar member;

a central recess formed above said central barrier wall and within said side wall member; and a raised gripping tab formed extending above from said central barrier wall in said central recess to be gripped and pulled to exert an outward pulling force on said central barrier wall, causing said side wall member to move inwardly break the seal and reduce adhesion between said sealing plug and said sleeve member for ease of removal from said flange.

2. The flange assembly of claim 1, wherein:

said closure lip, said collar member and said sleeve member define a sealant pocket for receiving an adhesive sealant material therein.

3. The flange assembly of claim 2, wherein the adhesive sealant material is an elastomer.

4. The flange assembly of claim 2, further including:

injector ports formed in said collar member for addition of the sealant material into said sealant pocket.

5. The flange assembly of claim 4, further including:

guide sleeves formed in said collar member adjacent said injector ports for forming side walls of said injector ports.

6. The flange assembly of claim 4, further including:
connector members insertable into certain of said injector ports to connect said collar member to the covering and increase the gripping force between said flange and the insulation covering.

7. The flange assembly of claim 2, further including:
a sealing ring mounted about said sleeve member in said sealant pocket.

8. The flange assembly of claim 7, wherein:
said sealing ring is compressed between said collar member and the insulation covering.

9. The flange assembly of claim 1, further including:
flexure seams formed in said collar member to permit said collar member to be bent to conform to the surface of the insulation covering.

10. The flange assembly of claim 1, further including:
an insertion chamfer formed about a lower portion of said side wall member for ease of insertion of said sealing plug into said flange.

11. The flange assembly of claim 1, further including:
a sealing lip formed on said plug extending outwardly from an upper portion of said side wall member to seal against said collar member.

12. The flange assembly of claim 11, further including:
an attachment lug formed on said sealing lip.

13. The flange assembly of claim 12, further including:
a connector member insertable through said collar member to attach said collar member to the insulation covering.

14. The flange assembly of claim 13, further including:
a connector line attached between said connector member and said attachment lug to connect said sealing plug and said flange.

15. The flange assembly of claim 1, wherein the insulation covering has an uneven exterior surface, and further including:
a transition gasket for fitting between the exterior surface of the insulation covering and said flange;
said transition gasket having a first surface conforming to the exterior surface of the insulation covering for contact therewith;
said transition gasket having a second surface for engagement by said collar member of said flange.

16. The flange assembly of claim 1, further including:
a connector collar adapted to receive said sleeve member therein.

17. The flange assembly of claim 1, further including:
said sleeve member having a side wall with an inwardly curved lower fitting lip permitting insertion of said sleeve member into the access port.

18. An access plug flange assembly for sealing an inspection port in insulation covering for a chemical processing vessel, comprising:
a flange for fitting in the insulation covering to serve as a receiving member, comprising:
a sleeve member having a planar outer wall conforming to a side wall of the insulation covering for fitting into the insulation covering;
a collar member formed at an upper end of said sleeve member;
said collar member having an access passage formed therein;
a sealing plug insertable into said access passage in said collar member for sealing contact therein, comprising:
a side wall member confirming to said sleeve member outer wall for sealing against it;
a central barrier wall extending between and connecting said side wall member at a lower end thereof to seal said access passage in said collar member;
a central recess formed above said central barrier wall and within said side wall member; and
a raised gripping tab formed extending above from said central barrier wall in said central recess to be gripped and pulled to exert an outward pulling force on said central barrier wall, causing said side wall member to move inwardly break the seal and reduce adhesion between said sealing plug and said sleeve member for ease of removal from said flange.

19. The flange assembly of claim 18, further including:
a connector member insertable through said collar member to attach said collar member to the insulation covering.

20. The flange assembly of claim 18, wherein said sealing plug has an external dimension greater than the internal dimension of said access passage in said collar member, causing said sealing plug to be in compression when inserted into said collar member.

21. An access plug flange assembly for sealing an inspection port in insulation covering for a chemical processing vessel, comprising:
a flange for fitting in the insulation covering to serve as a receiving member, comprising:
a sleeve member conforming to a side wall of the insulation covering for fitting into the insulation covering;
a collar member formed at an upper end of said sleeve member;
said collar member having an access passage formed therein;
said collar member having a downwardly extending outer closure lip for contacting the insulation covering;
said closure lip, said collar member and said sleeve member define a sealant pocket for receiving an adhesive sealant material therein;
a sealing plug insertable into said access passage in said collar member for sealing contact therein, comprising:
a side wall member parallel with said sleeve member for sealing against it; and
a central barrier wall extending between and connecting said side wall member at a lower end thereof to seal said access passage in said collar member.

22. The flange assembly of claim 21, wherein the adhesive sealant material is an elastomer.

23. The flange assembly of claim 21, further including:
injector ports formed in said collar member for addition of the sealant material into said sealant pocket.

* * * * *